United States Patent [19]

Salg

[11] 3,848,764
[45] Nov. 19, 1974

[54] ELECTRICAL BOX STRUCTURE FOR SECUREMENT TO WALL PANELING WITHOUT SEPARATE FASTENERS

[75] Inventor: George Salg, River Forest, Ill.

[73] Assignee: Reflect-O-Lite Manufacturing Company, Chicago, Ill.

[22] Filed: Aug. 25, 1972

[21] Appl. No.: 283,850

[52] U.S. Cl. .................. 220/3.6, 174/57, 174/58
[51] Int. Cl. ............................................ H02g 3/08
[58] Field of Search ............ 220/3.2, 3.3, 3.4, 3.5, 220/3.6, 3.7, 3.8, 3.9, 3.92, 3.94, 18; 174/57, 58; 248/27, DIG. 6

[56] References Cited
UNITED STATES PATENTS

| 982,841 | 1/1911 | Maison | 248/DIG. 6 |
|---|---|---|---|
| 1,961,728 | 6/1934 | Arnest et al. | 174/57 |
| 2,299,674 | 10/1942 | Austin, Jr. | 220/3.5 |
| 2,769,562 | 11/1956 | Rudolph | 220/3.6 |
| 2,842,281 | 7/1958 | Chisholm | 220/3.6 |
| 2,871,324 | 1/1959 | Budd | 220/3.6 |
| 2,959,633 | 11/1960 | Palmer et al. | 220/3.2 |
| 3,007,599 | 11/1961 | Greasley | 220/3.6 |
| 3,659,037 | 4/1972 | MacDonald | 220/3.6 |
| 3,701,451 | 10/1972 | Schindler et al. | 174/58 |
| 3,710,972 | 1/1973 | Barry | 220/3.6 |

FOREIGN PATENTS OR APPLICATIONS 1,231,331  12/1966  Germany .................. 220/3.6

Primary Examiner—William I. Price
Assistant Examiner—Stephen Marcus

[57] ABSTRACT

A plastic electrical box providing integral wall panel engaging members for direct securement, without separate fasteners, in an opening in wall paneling. The box is proportioned to be pushed into a wall panel opening and fingers are provided to confront the inner face of the panel to prevent retraction of the box outwardly of the wall paneling after the box has been installed. The box may alternatively be secured by separate fasteners to framing, where desired.

13 Claims, 8 Drawing Figures

PATENTED NOV 19 1974  3,848,764
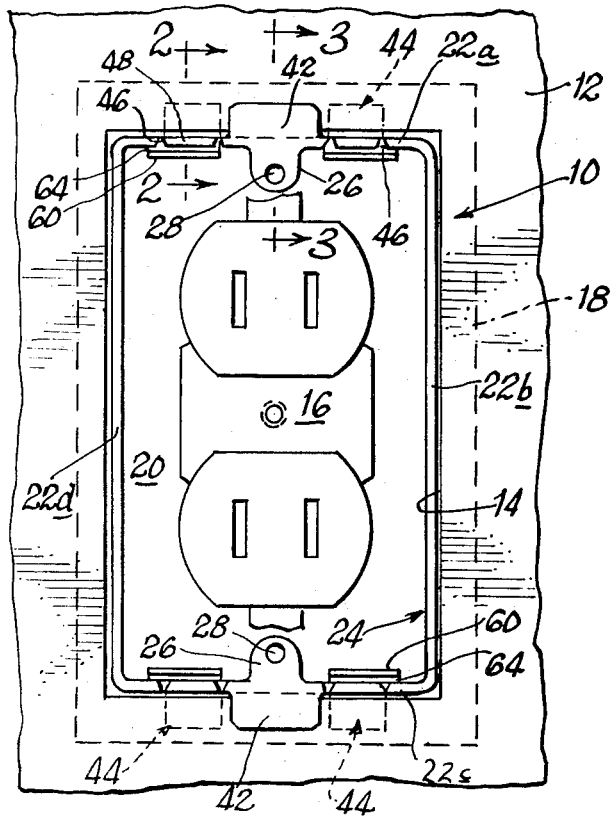
FIG. 1
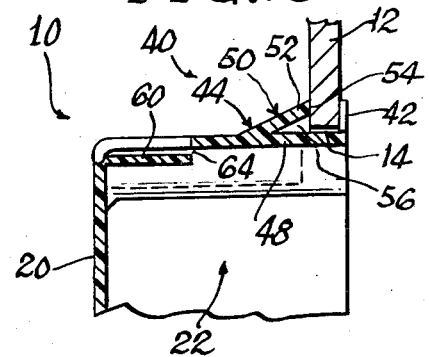
FIG. 2
FIG. 3
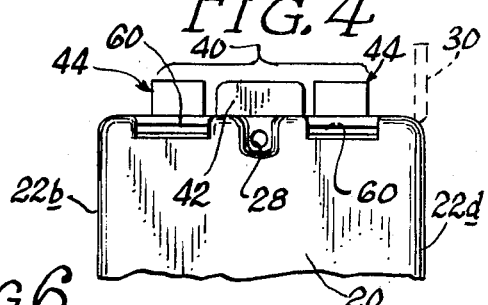
FIG. 4
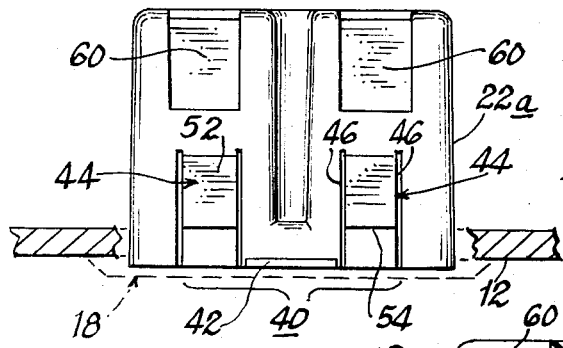
FIG. 5
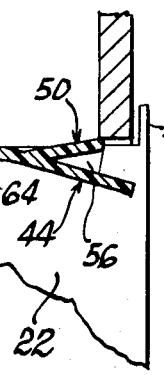
FIG. 6
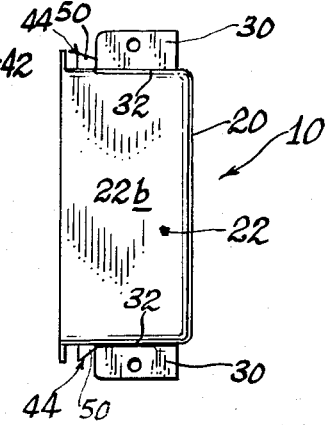
FIG. 7
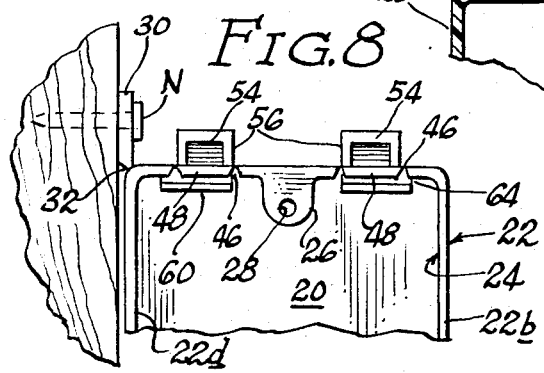
FIG. 8

ELECTRICAL BOX STRUCTURE FOR SECUREMENT TO WALL PANELING WITHOUT SEPARATE FASTENERS

This invention relates to a novel electrical box for mounting electrical components, such as receptacles and switches, and particularly to an improved plastic electrical box which is especially adapted for use in wiring systems for mobile homes and the like.

A large variety of electrical boxes for receiving electrical components have been developed and are available on the market. Some of these are metallic, and others are of plastic and of glass fiber reinforced plastic materials. All of the boxes currently available require the use of fasteners, such as nails, screws and the like, to secure them to a wall assembly, either to wall paneling or to framing provided for mounting wall paneling. The fastening by nails, screws and the like has been considered necessary because most building codes require electrical boxes to be securely fixed, as by nails or screws to the wall assembly. That has been so for the metallic boxes that have been used for many, many years, as well as for the plastic boxes which have recently come into use.

In accordance with this invention, a plastic electrical box structure is provided which is adapted to be directly secured to a wall panel without extraneous fasteners. The wall paneling with which the box structure of this invention may be used may be of any type, such as of wood, synthetic hardboard, and plasterboard. In each case the paneling is provided, as by sawing in a conventional manner, with a suitable aperture or opening through which the box structure may be inserted so that it is recessed, in the usual fashion, behind the panel for receipt of an electrical component, such as a receptacle or a switch, and so that electrical conductors may be brought to the box behind the panel.

The box structure itself comprises a back wall and a sidewall, the sidewall comprising a plurality of sidewall segments extending forwardly of the back wall to define, with the back wall, a hollow, open box structure having an open front which is spaced from the back wall, into which hollow an outlet, switch or the like may be inserted and in which hollow the outlet or switch may be mounted.

The box structure mounts means for securing the box structure directly to the wall panel without separate fasteners. The securing means comprises stop members for controlling the depth of entry of the box structure into the space behind the wall panel, and for engaging the front surface of the wall panel when the box structure is secured in place. The securing means further comprises deflectible fingers which are mounted on the box structure and which are located rearwardly of the stop members. The fingers are adapted to engage the back surface of a wall panel adjacent the aperture in the panel when the box structure has been fully inserted through the aperture. The fingers are proportioned to be deflected inwardly of the box structure as the box is being pushed through a wall panel aperture and to move resiliently outwardly of the box structure when the stop members have engaged the front surface of the wall panel, thereby to position the wall panel adjacent the aperture between the fingers and the stop members, hence to prevent removal of the box structure forwardly of the opening.

In a preferred embodiment, the fingers are integrally formed with the plastic box structure and are elongate, being integral with the box at one end and being spaced from the sidewall along a narrow spaced pair of slits at their sides. The fingers desirably each comprise a detent projecting away from the box structure, the detent having a front face positioned to engage and confront the back surface of a wall panel adjacent the aperture and a sloping upper surface to engage the periphery of the panel aperture, thereby to deflect the fingers inwardly as the box structure is pushed inwardly through the aperture. The fingers may be positioned closely adjacent the stop members and preferably comprise a pair of fingers, in front elevation, straddling each stop member, of which there are at least two.

The box structure preferably defines a plurality of knock-outs formed with the box structure along weakened lines of connection to facilitate their easy separation, thereby to provide ready access for electrical conductors to the interior of, from the exterior of, the box structure.

Such electrical boxes are quickly and easily secured directly to a wall panel without fasteners, making it possible to complete the installation of a wall assembly, including the mounting of the paneling, prior to securing electrical boxes thereto. With prior art constructions requiring extraneous fasteners, most frequently electrical boxes are secured to studs, or furring strips or other framing, after which the wall paneling is secured to the framing. That is not necessary in accordance with this invention, a great advantage, particularly for the mobile home industry.

These and other objects, features and advantages of this invention will become apparent from the following description and drawings, of which:

FIG. 1 is a front elevation of a wall assembly in which an electrical box structure of this invention has been installed;

FIG. 2 is a fragmentary cross-sectional view taken substantially along the line 2—2 of FIG. 1;

FIG. 3 is a fragmentary cross-sectional view taken substantially along the line 3—3 of FIG. 1;

FIG. 4 is a fragmentary rear elevational view of the box structure of FIG. 1 taken substantially along the line 4—4 of FIG. 3;

FIG. 5 is a plan view of the assembly of FIG. 1;

FIG. 6 is a schematic view similar to FIG. 2 showing the box of FIG. 1 as it is being pushed into supported engagement with a wall panel;

FIG. 7 is a side elevational view of the box of FIG. 1 prior to use; and

FIG. 8 is a fragmentary front elevational view similar to FIG. 1, showing an electrical box optionally secured to framing.

Referring first to FIGS. 1 to 6, an electrical box assembly of this invention comprises an electrical box structure 10 adapted to be secured to a wall panel 12 in an appropriately cut out wall panel aperture 14. The electrical box structure 10 is proportioned to mount a conventional electrical component, such as a receptacle 16, and to be covered, as by a conventional cover plate 18. Box 10 is molded and is of a suitable plastic material, such as a thermoplastic acrylonitrile-butadiene-styrene.

The box structure 10 comprises a back wall 20 and a somewhat flexible and deflectible sidewall 22 consisting of sidewall segments 22a, 22b, 22c, and 22d. Sidewall segments 22a–22d, together with back wall 20, form a hollow open box structure defining an open front 24 spaced from the back wall 20. Although an electrical box structure 10 has been illustrated as being generally rectangular and adapted to mount a single electrical component, of course box structures in accordance with this invention may be square, round, octagonal, or any other conventional shape, and may be adapted to mount two or more electrical components, all in accordance with known practice in the art.

The box structure 10 provides mounting bosses 26 defining apertures 28 proportioned to receive threaded fasteners for securing a receptacle 16, or the like, to the box, as is schematically illustrated in FIG. 1.

Although this invention is especially concerned with the panel gripping assembly to be described, the plastic electrical box structure 10 is also adapted both for direct securance to a wall panel without fasteners and, alternately, for securance, as to framing, by mounting ears 30 through which fasteners, such as nails N, may be driven thereby to mount the box structure 10 to the framing (see FIGS. 7 and 8). The mounting ears 30 are integral with the box structure along frangible break lines 32, thereby to permit their easy removal when the box structure 10 is to be used in accordance with its primary application, the direct securance to a wall panel without fasteners.

Electrical box structure 10 provides a panel securing assembly 40, which preferably is integrally formed with the box structure, as by being molded integrally with sidewall 22. Panel securing assembly 40 includes at least two spaced stop members 42 and cooperable deflectible resilient spring fingers 44. Spring fingers 44 are spaced rearwardly of the stop members so that when the box is secured to the wall panel 12, the stop members 42 confront the front surface of the wall panel, and the spring fingers confront the back surface of the wall panel, both adjacent the periphery of aperture 14.

The spring fingers 44 are proportioned to be deflected inwardly of the box structure when it is pushed inwardly through the aperture 14 and are proportioned resiliently to move outwardly of the box structure when they have passed through the opening, and when the stop members 42 have contacted the front surface of the wall panel. Spring fingers 44 are elongated and integral with the sidewall, as at sidewall segments 22a and 22c, and each of them is spaced from the main body of the sidewall along its length along a narrow pair of slits 46. Each spring finger 44 further comprises a finger element 48 which defines a portion of the sidewall intermediate slits 46, and an outwardly extending detent or locking element 50. Locking element 50 comprises an upwardly sloping cam segment 52 adapted to engage the periphery of the panel aperture 14 and to cooperate therewith to deflect the fingers 44 inwardly of the box structure 12 and a front surface which, in the illustrated embodiment, comprises a generally planar front face 54 positioned to confront the back surface of the wall panel adjacent the aperture 14 when fingers 44 have reached the position illustrated by FIGS. 2 and 3, having moved through the intermediate position illustrated by FIG. 6. To provide spring fingers with a locking element 50 which has an optimum strength, yet has a minimum amount of plastic material, the upwardly sloping cam segment 52 terminates at its sides in downwardly extending generally triangularly shaped sides or webs 56 (see FIG. 8) which provide forward edges forming part of the front face 54.

As seen in FIGS. 1, 2, 3 and 6, a box structure 10 in accordance with the drawings may be assembled to a wall panel in an appropriately cutout opening, after mounting ears 30 have been broken off, simply by positioning the box structure in an aperture 14, pushing it rearwardly through a series of finger deflecting positions illustrated generally by FIG. 6, until the box reaches the position of FIGS. 2 and 3. At that time, the spring fingers will have returned to their outwardly sprung positions, and a panel will be positioned between stop members 42 and spring fingers 44. Where the wall panel 12 is of a thickness equal to the spacing between the stop members 42 and the spring fingers 44, the wall panel will be tightly gripped adjacent the periphery of the aperture 14. Where the panel thickness is somewhat less than the distance between stop member 42 and fingers 44, a looser grip or securement, but a retentive engagement nonetheless, will be provided.

It should be noted that the spring fingers 44 are so positioned on box structure 10 that when their faces 54 are positioned against the back surface of wall panel 12, the sidewall 22 will project just slightly beyond the wall panel 12 (see FIGS. 2 and 3). That position will be maintained when a cover plate 18 is secured to the box structure 10 or to the electrical component, thereby to provide shielding for the paneling adjacent the periphery of the opening, to protect against fire due to overheating or the like.

In the embodiment illustrated, the spring fingers 44 are shown as being located closely adjacent their associated stop members 42, a pair of the fingers straddling a stop member when viewed in front elevation, as clearly shown by FIGS. 1 and 8. Such an arrangement provides a stable panel securing assembly 40. However, the stop members may be spaced away from the spring fingers and the principal requirement of the panel securing assembly is that there be stop members and fingers which, when they closely confront the front and back surfaces of a wall panel adjacent the periphery of a wall panel aperture, will prevent forward and rearward removal of the electrical box structure 10.

The box structure 10 also provides a suitable number of knock-outs 60. Preferably the knock-outs are molded along frangible peripheries, so that they are easily broken away, as necessary, from the box structure 10. To facilitate breaking them out, they may be slightly recessed inwardly, as best seen in FIGS. 2 and 8, to provide a narrow slot 64 into which a screwdriver blade or the like may be inserted for twisting or prying, thereby to assist in breaking out the knock-outs.

As seen in FIGS. 7 and 8, and as explained above, electrical box structure 10 may mount mounting ears 30 adapted to be broken off along frangible break lines 32. When the box is mounted by mounting ears 30, rather than by the panel securing assembly 40, it is desirable to break away stop members 42 also, and they are shown as having been broken away in FIG. 8. In this case, spring fingers 44 serve to gauge the forward projection of the box structure, and as back-up elements for the panel 12 when it is positioned on the adjacent studs.

While this invention is susceptible of embodiment in many different forms, there has been shown and described in detail a presently preferred embodiment of the invention, with the understanding that the present disclosure is intended to be an exemplification of the principles of the invention, and not to be limiting upon the invention. The scope of the invention will be pointed out in the appended claims.

I claim:

1. A plastic molded electrical box assembly secured without fasteners to a wall panel and supported in an opening defined by said panel, said box assembly comprising a plurality of sidewall segments each extending forwardly of said back wall to collectively define, with said back wall, an open hollow box assembly defining an open front spaced from said back wall, said sidewall being substantially the same shape and size, in front elevation, as said panel opening, and integral wall panel securing means comprising stop members extending outwardly of said sidewall segments for limiting entry of said box assembly through said wall panel opening from the front and for engaging the front surface of said wall panel when the box assembly is secured to said panel, and outwardly extending locking elements integral with the sidewall segments of said box assembly and located a given fixed distance rearwardly of said stop members for engaging the back surface of said wall panel when the box assembly is supported in said opening, said locking elements each comprising an upwardly sloping cam segment having one end merging in the sidewall segment and an opposite exposed end disposed entirely outwardly of the respective sidewall segment, whereby said locking elements are proportioned to be deflected inwardly when said box assembly is pushed inwardly through said opening and then resiliently to move outwardly when said stop members have engaged the front surface of said wall panel, said locking elements being proportioned to prevent removal of said box assembly forwardly of said opening, and to prevent removal of said box assembly from said wall panel, and a plurality of knock-outs formed with said box assembly along weakened lines of connection to facilitate their easy separation, thereby to provide access for electrical conductors to the interior from the exterior of said box assembly.

2. An electrical box assembly secured without fasteners to a wall panel and supported in an opening defined by said panel in accordance with claim 1 wherein said locking elements are closely adjacent said stop members and where, in front elevation, a pair of said locking elements straddle a said stop member.

3. An electrical box assembly secured without fasteners to a wall panel and supported in an opening defined by said panel in accordance with claim 1 wherein said cam segments are elongated and are each spaced from said sidewall along a narrow spaced pair of slits in said sidewall.

4. An electrical box assembly secured without fasteners to a wall panel and supported in an opening defined by said panel in accordance with claim 3 wherein each said locking element defines a portion of said sidewall intermediate said spaced pair of slits and positioned inwardly of said cam segment.

5. A molded plastic, hollow electrical box structure in accordance with claim 4 wherein at least one generally triangularly shaped web extends inwardly of each cam segment.

6. A molded plastic, hollow electrical box structure adapted to be inserted in an opening in a wall panel and to be secured thereto without fasteners, said box structure comprising an integral back wall and a sidewall forwardly of said back wall and forming with said back wall an open box structure defining an open front forwardly of said back wall and circumscribing a hollow space therewithin, said sidewall being formed of a plurality of generally planar sidewall segments, a plurality of knockout portions formed with said box structure along weakened lines of connection thereby to facilitate their easy separation from the box structure, and integral wall panel securing means comprising stop members for controlling the depth of entry of said box structure when it is inserted through a wall panel opening from the front of said wall panel into the space behind the wall panel and for engaging the front surface of said wall panel when the box structure is secured to said wall panel, said securing means further comprising locking element means mounted on and integral with at least one sidewall segment of said box structure and spaced rearwardly of said stop members by a given fixed distance and positioned for engaging the back surface of said wall panel when the box structure is secured to said wall panel, said locking element means and said stop members extending outwardly of said hollow space, said locking element means being positioned to be pushed inwardly as said box structure is inserted through said wall panel opening and then resiliently to move outwardly when said stop members have engaged the front surface of said wall panel, said locking element means defining an upwardly sloping camming surface to engage the periphery of said wall panel opening so that as said box structure is pushed inwardly through said opening, the locking element means will be deflected inwardly, there being a sidewall portion inwardly of said camming surface and connected thereto, said sidewall portion normally being disposed in the plane of its associated sidewall segment and being deflectable inwardly of the hollow space of said box structure when said box structure is pushed inwardly through said wall panel opening, said locking element means being proportioned to prevent removal of said box structure forwardly of a wall panel opening, so that when a wall panel is disposed between said stop members and said locking element means, said box structure may not readily be moved inwardly or outwardly of said wall panel.

7. A molded plastic, hollow electrical box structure in accordance with claim 6 in which said locking element means comprises a pair of spaced apart locking elements.

8. A molded plastic, hollow electrical box structure in accordance with claim 6 in which said sidewall portion is integral with its sidewall segment at one end and which is spaced from its sidewall segment along its length by a pair of spaced narrow slits in said sidewall segment.

9. A molded plastic, hollow electrical box structure in accordance with claim 6 in which said locking element means comprises a pair of spaced locking elements, and each said upwardly sloping camming surface is generally planar and merges with its associated sidewall segment.

10. A molded plastic, hollow electrical structure in accordance with claim 6 in which said locking element means comprises a pair of locking elements which are integral with sidewall segments which are opposite each other.

11. A molded plastic, hollow electrical box structure in accordance with claim 6 wherein said sidewall segments and said sidewall portion terminate generally in the same plane at the front of said box structure.

12. A molded plastic, hollow electrical box structure in accordance with claim 6 wherein said sidewall portion is connected to said camming surface by at least one generally triangularly shaped web.

13. A molded plastic, hollow electrical box structure in accordance with claim 12 wherein said sidewall portion is connected to said camming surface by a pair of spaced generally triangularly shaped webs, so that an open space is defined between said webs.

* * * * *